Figure 5:
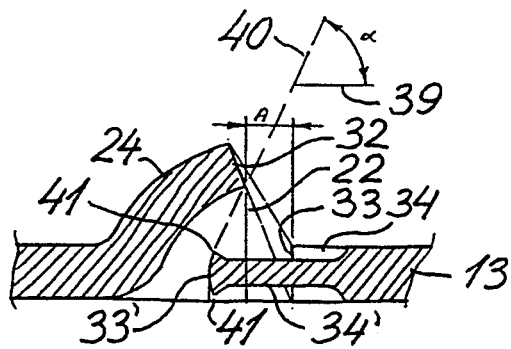

United States Patent [19]

Christensen et al.

[11] Patent Number: 5,392,531
[45] Date of Patent: Feb. 28, 1995

[54] BED PLATE FOR A FLUIDIZED BED APPARATUS AND A METHOD FOR MAKING THE SAME

[75] Inventors: Mogens Christensen, Virum; Benny Madsen, Horsens, both of Denmark; Mikael Bonde, Basel, Switzerland

[73] Assignee: Niro Holding A/S, Copenhagen K, Denmark

[21] Appl. No.: 117,205

[22] PCT Filed: Apr. 2, 1992

[86] PCT No.: PCT/DK92/00102
§ 371 Date: Feb. 28, 1994
§ 102(e) Date: Feb. 28, 1994

[87] PCT Pub. No.: WO92/17273
PCT Pub. Date: Oct. 15, 1992

[30] Foreign Application Priority Data

Apr. 5, 1991 [EP] European Pat. Off. .......... 91610029

[51] Int. Cl.⁶ .............................................. F26B 17/00
[52] U.S. Cl. ........................................ 34/583; 34/582; 34/360; 29/163.6
[58] Field of Search ............... 34/576, 582, 583, 585, 34/586, 588, 359, 360, 369; 29/163.6, 34 R

[56] References Cited

U.S. PATENT DOCUMENTS

| | | | |
|---|---|---|---|
| 1,802,960 | 4/1931 | Simonds . | |
| 2,728,316 | 12/1955 | Oberg et al. | 113/42 |
| 3,611,765 | 10/1971 | Harvey | 72/55 |
| 3,733,056 | 5/1973 | Fong | 259/4 |
| 4,724,794 | 2/1988 | Itoh | 118/303 |
| 4,787,152 | 11/1988 | Mark | 34/359 |
| 4,885,848 | 12/1989 | Christensen | 34/576 |

FOREIGN PATENT DOCUMENTS 2095614 2/1972 France .
3010007 10/1981 Germany .

Primary Examiner—Denise L. Gromada
Attorney, Agent, or Firm—Dennison, Meserole, Pollack & Scheiner

[57] ABSTRACT

A bed plate (13) for a fluidized bed apparatus is made from a plate (23) from sheet metal and comprises openings (22) for fluidizing air or gas of the so-called "gill-type". In order to reduce or prevent fall-through of product, at least one of the edge portions (24,34) defining the opening (22) has been deformed so as to increase the extension thereof along the plane of the bed plate, and so as to thereby reduce or eliminate the orthographic projection on said plane of the opening (22). Such deformation may comprise compression and/or stretching. The edge portion or portions (24,34) are preferably deformed to such an extent that a partial overlap is obtained.

23 Claims, 2 Drawing Sheets

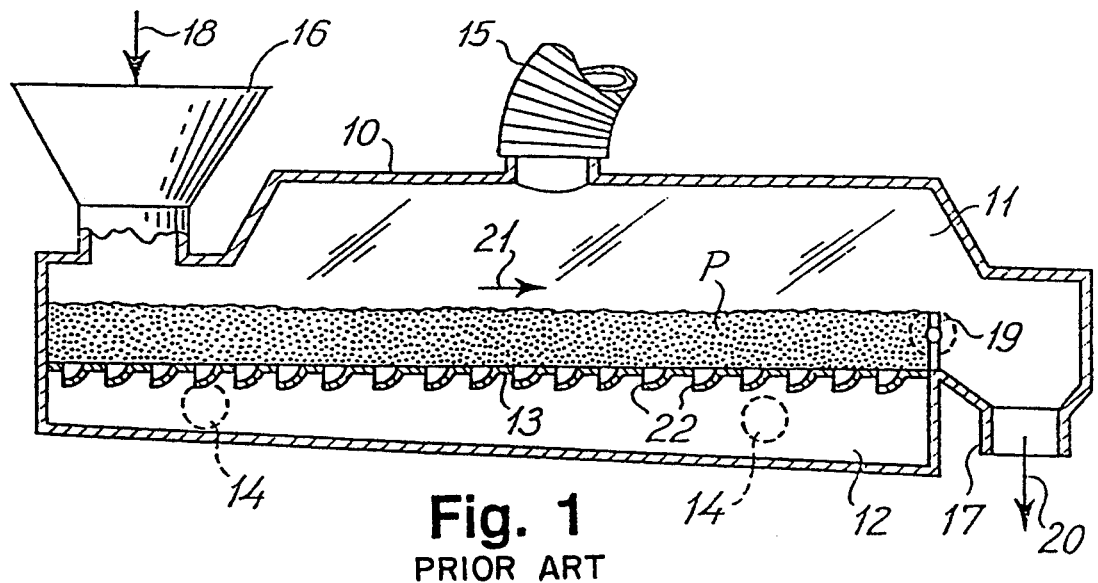
Fig. 1
PRIOR ART
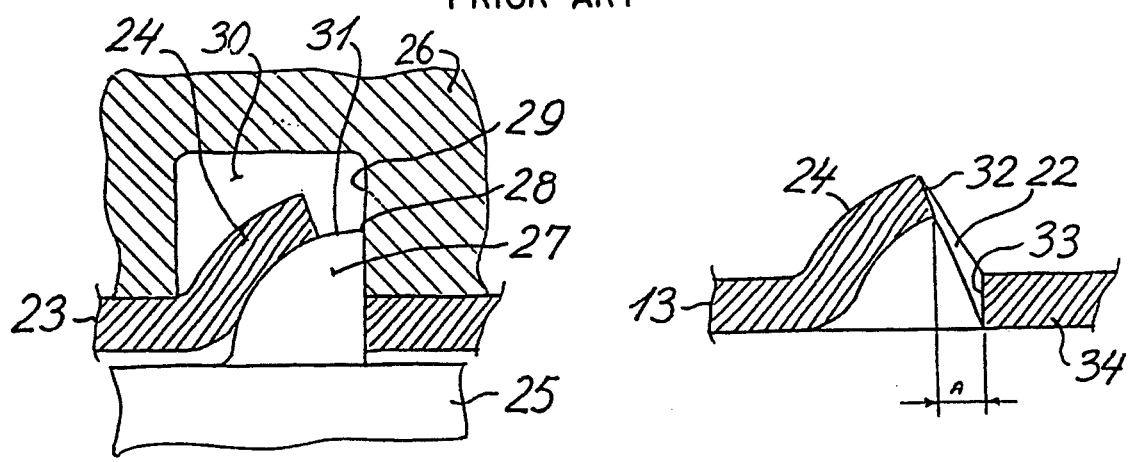
Fig. 2
PRIOR ART
Fig. 3
PRIOR ART
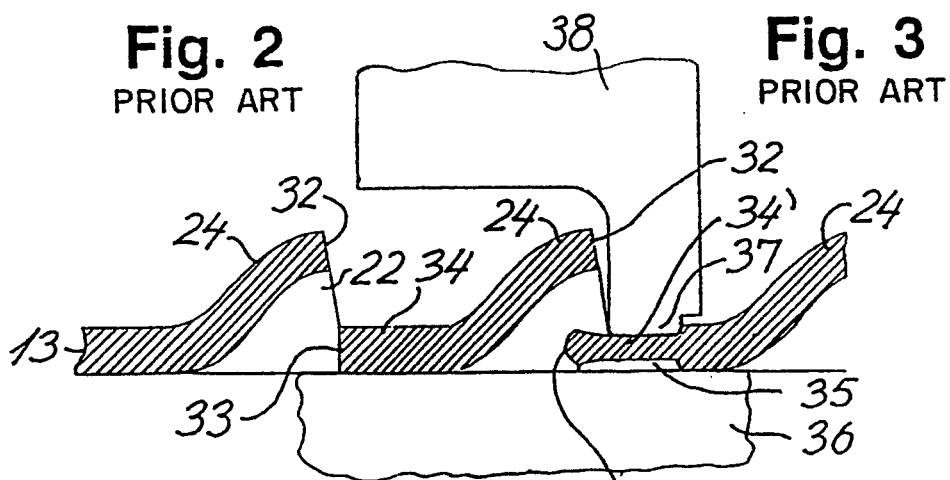
Fig. 4

BED PLATE FOR A FLUIDIZED BED APPARATUS AND A METHOD FOR MAKING THE SAME

The present invention relates to a bed plate for a fluidized bed apparatus, a fluidized bed apparatus comprising such bed plate, and to a method for making the bed plate.

Fluidized bed apparatuses are used for example as dryers and/or agglomerators, and for otherwise treating a powdered or particulate product with gas or air, for example for cooling the product, or as fluid bed combustors for combustion of powdered or particulate fuel, etc. Such fluid bed apparatuses may comprise a bed plate which is made from sheet metal having a plurality of air or gas distributing openings or perforations punched therein. The openings or perforations may be plain, circular openings. The diameter of such openings are usually chosen as small as possible in order to reduce the amount of powdered or particulate product which may fall through the openings of the bed plate into an underlying air or gas plenum chamber, for example, when the operation of the fluid bed is interrupted or stopped.

Bed plates having openings or perforations of the so-called "gill type" are also known, for example from U.S. Pat. Nos. 3,821,342 and 4,033,555. This type of openings or perforations define fluidizing flows of air or gas having a flow component which is directed along the upper surface of the bed plate, for example towards a product outlet of the fluid bed. Such flow component directed towards the product outlet renders it possible to obtain a self-clearing or self-emptying effect when the operation of the apparatus is stopped, and the fall-through of products may thereby be further reduced.

An opening or perforation of the "gill-type" may be made by cutting a slit or slot in the sheet metal so as to form opposite edges, and by pressing one of the opposite edge portions out from the plane defined by the sheet metal. Such depression of one edge portion causes it to be moved away from the other whereby the slit or slot is opened also when viewed in a direction at right angles to the plane of the sheet metal. This means that the product in a fluid bed formed on a bed plate having openings of the conventional gill type may to some extent fall through the openings of the bed plate, when the supply of fluidizing air or gas is stopped or interrupted. In cases where even such reduced fall-through of product is unacceptable it is necessary to use a bed plate with nozzles of the type disclosed in the published UK patent application GB 2 015 377. This known, rather complicated and expensive bed plate cannot be made by punching sheet metal. Furthermore, this known bed plate can only be made with a relatively small number of openings per unit of area because of relatively large minimum dimensions of each opening.

The present invention provides bed plate which may be made from sheet metal by simple cutting and deforming operations, and which may be made so that fall-through of the product to be fluidized is substantially reduced or prevented.

The present invention provides a bed plate for a fluidized bed apparatus, said bed plate, which is made from sheet metal, defining a first general side surface and having a plurality of gas distributing openings formed therein, each of said openings being defined between first and second opposite edge portions, of which at least the first edge portion has been pressed out from said general side surface, and the bed plate according to the invention is characterized in that the thickness of at least part of at least one of said first and second edge portions has been reduced so as to increase the extension thereof along said first general side surface, and so as to thereby reduce or eliminate the orthographic projection on said first general side surface of the opening defined between said first and second edge portions.

The first and/or second edge portion may be deformed in any manner causing a reduction of the transverse spacing of the first and second edge portions as viewed in a direction at right angles to the first side surface.

Basically, the bed plate according to the invention may be made in a similar manner as a bed plate having openings of the conventional "gill type". Thus, the first and second edge. portions may be located on opposite sides of a cut made in the sheet metal.

In principle, the first side surface defined by the bed plate may have a curved shape. In the preferred embodiment, however, this first side surface is substantially plane. As mentioned above, one or both of the opposite edge portions may be deformed in any manner so as to increase the extension thereof to a smaller or higher extent. The edge portion or portions may even be deformed to such a degree that the first and second edge portions at least partly overlap in an orthographic projection on said first side surface, whereby fall-through of the product to be fluidized is prevented to a high degree.

Normally, the necessary deformation of the edge portion or edge portions in order to cause said increase of extension involves a reduction of the thickness of a least part of said at least one of the first and second edge portions. Such thickness reduction may, for example, be obtained by compressing at least part of the edge portion in question. In the preferred embodiment at least part of the second edge portion has been compressed so as to reduce its thickness. Alternatively or additionally one or both of the edge portions may be stretched, and preferably at least part of the first edge portion has been stretched. In the conventional openings of the "gill type" the edge portion which has been pressed out, has a rounded or curved cross-sectional shape. It has been found, however, that the fall-through of product may be reduced when the pressed out edge portion is mainly defined by substantially flat wall sections defining an angle therebetween. Thus, the first edge portion may comprise an outer part defining a free edge and an inner connecting part-separated from the outer part by a relatively sharp bend, and a cross-section of the inner and outer parts taken substantially at right angles to said free edge may define first and second acute angles, respectively, with said general side surface, the second acute angle being substantially smaller than the first angle. When the bed plate is positioned so that the pressed out first edge portions are facing downwardly, product falling through the openings of the bed plate may be caught and supported by the outer parts of the first edge portions. This is especially the case, when the outer part of each of the first edge portions extends substantially parallel with the first general plane, or when the said outer part is slightly inclined upwardly towards the free edge thereof.

The thickness of the inner part of the first edge portion may have been reduced by stretching. As an example, the openings of the bed plate may be formed by punching, and while the first edge portion is pressed out from the plane of the sheet metal by means of a punching tool, the outer part may be fixed in relation to the punching and pressing tool, whereby the inner part of the edge portion is stretched so as to increase the extension of the edge portion along the first general plane of the bed plate. Such fixing of the first edge portion in relation to the punching tool may, for example, at least to some extent be caused by the sharp bend separating the inner and outer parts of the first edge portion.

A desired predetermined area of a bed plate opening may be obtained either by making a relatively short cut in the sheet metal and by depressing the first edge portion relatively deeply, or by making a relatively long cut, and by depressing the first edge portion less deeply. In the latter case the risk of fall-through of product is substantially minimized. Therefore, in the bed plate according to the invention each opening is preferably elongated and defined between a pair of coextending or substantially parallel edges which may then have a relatively small spacing.

Preferably, only the first edge portion is pressed out from the general side surface, but it is also possible to press both of the edge portions out from the plane of the sheet metal, for example in order to define a tortuous gas flow path therebetween. The openings of the bed plate may also be arranged in pairs of substantially oppositely directed openings, and a depressed portion of the plate may then extend between the openings of each pair, for example as disclosed in U.S. Pat. No. 4,885,848.

According to a second aspect, the present invention provides a fluidized bed apparatus, for example a fluidized bed dryer or agglomerator, comprising a bed plate according to the invention as described above and further comprising means for passing gas upwardly through the openings of the bed plate for fluidizing a powdered or particulate product thereon, means for supplying powdered or particulate product to the bed plate, and means for removing fluidized product therefrom.

According to a third aspect, the present invention provides a method for making a bed plate from sheet metal, said method comprising forming a plurality of mutually spaced cuts or slits in the sheet metal, each slit being defined between opposite first and second edge portions, and pressing at least the first edge portion out from a plane defined by the sheet metal so as to form an opening, and the method according to the invention is characterized in deforming at least one of said first and second edge portions so as to increase the extension thereof along the plane of the sheet metal.

According to the present invention each opening in the bed plate, may be formed by means of a punching tool having a cutting edge and being moved substantially at right angles to the plane defined by the sheet metal so as to cut said slit. Therein, the punching tool being moved further in relation to the sheet metal so as to press the first edge portion out of the plane defined by the sheet metal. An outer part of the first edge portion adjacent to its free edge may then substantially be prevented from moving in relation to the punching tool, whereby an inner connecting part of the first edge portion is stretched. The outer part may, for example, be clamped to the punching tool in any suitable matter. Alternatively or additionally, the punching tool may comprise a sharp tool edge coextending with or extending substantially parallel with said free edge. The sharp tool edge then forms a sharp bend on the first edge portion and tends to prevent the outer part from moving in relation to the punching tool.

As mentioned above, the outer part of the first edge portion preferably extends substantially parallel with the plane of the bed plate. Alternatively, the free edge of the outer part of the edge portion may be directed towards the plane of the bed plate. In order to obtain any of such directions of the outer part of the first edge portion, the punching tool may comprise first and second substantially plane surface parts, which are separated by said sharp tool edge and intended to form the inner and outer parts, respectively, of the first edge portion. The first plane surface may then define a first acute angle with the plane of the sheet metal and the first and second plane surfaces may mutually define an angle which is smaller than the angle supplemental of the first acute angle.

Figure 6:
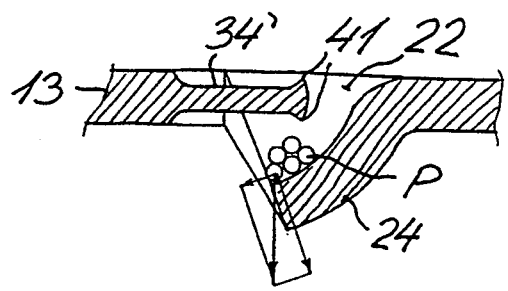
Figure 7:
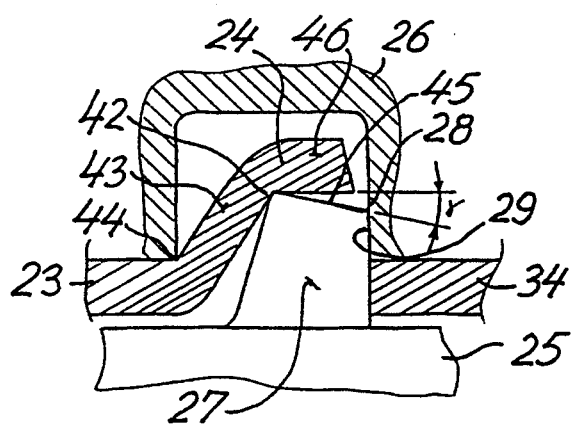
Figure 8:
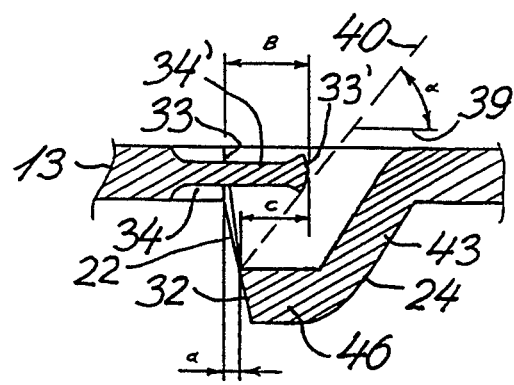

The invention will now be further described with reference to the drawings wherein FIG. 1 is a diagrammatic side view and partially sectional view of a fluidized bed drying apparatus comprising a bed plate with openings of the "gill type", FIG. 2 illustrates punching of a conventional "gill type" opening in sheet metal by means of a punching tool, FIG. 3 is a sectional view in a conventional "gill type" opening punched as illustrated in FIG. 2, FIG. 4 is a side view and partially sectional view illustrating a bed plate with openings of the conventional "gill type" being modified in accordance with the present invention by means of a compression tool, FIG. 5 is a sectional view corresponding to that shown in FIG. 3 after having been modified as illustrated in FIG. 4, FIG. 6 is a sectional view as that shown in FIG. 5, the bed plate having been turned around, so that the pressed out, gill-like edge portion of each opening of the bed plate is directed downwardly, FIG. 7 illustrates punching of an opening in sheet metal in accordance with the present invention by means of a punching tool in a manner so as to stretch the gill-like edge portion being pressed out from the plane of the sheet metal, FIG. 8 is a sectional view of an opening of a further embodiment of the bed plate according to the invention, FIG. 9(A-B) are sectional views showing a highly arched gill-type opening and taken along a line substantially parallel with and substantially at right angles to the slit of the opening, respectively, and FIG. 10(A-B) are sectional views of a flattened gill-type opening and taken along lines substantially parallel with and substantially at right angles to the slit of the opening, respectively.

FIG. 1 shows a fluidized bed dryer which may, for example, be used for drying a partially dried and still moist powdered or particulate product. The fluidized bed dryer shown in FIG. 1 comprises an elongated housing 10 having an inner space divided into upper and lower chambers 11 and 12, respectively, by means of a perforated bed plate 13, which is fastened to the inner walls of the housing 10. Heated drying gas or air is supplied to the lower chamber or plenum chamber 12 of the housing 10 through gas inlets 14, and drying gas is exhausted from the upper chamber 11 of the housing through a gas exhaust conduit 15, which may, for example, be connected to a cyclone, not shown, from which the drying gas may be exhausted into the atmosphere. At one end the housing 10 comprises a product inlet funnel 16, which opens into the upper chamber 11 defined above the perforated bed plate 13. At the other end the housing 10 has a product outlet 17, which also communicates with the upper chamber 11.

A moist powdered or particulate product P, which may, for example, be supplied from a conventional spray drying system and which has to be further dried, may be fed continuously to the product inlet 16 of the housing 10 as indicated by an arrow 18. Heated drying gas or drying air is supplied to the lower chamber 12 of the housing, and the heated gas flows upwardly through the perforations of the bed plate 13 and into the upper chamber 11 so as to form a plurality of gas flows fluidizing the product P on the bed plate 13. The thickness or the height of the fluidized product layer is determined by the height of a movable damper or valve member 19 forming an overflow at the outlet end of the chamber 11. When a state of equilibrium has been obtained an amount of dried product corresponding to the amount of moist product supplied through the inlet funnel 16 will flow out through the product outlet 17 as indicated by an arrow 20 in FIG. 1. Thus, when the fluidized bed dryer is operating the fluidized product layer supported by the bed plate 13 is moved continuously from the inlet funnel 16 to the product outlet 17 as indicated by an arrow 21. When the operation of the fluidized bed dryer has to be closed down, the supply of moist product to the inlet funnel 16 is stopped, and thereafter the damper or overflow plate 19 is moved to such a position that almost all of the product may flow from the bed plate 13 into the product outlet 17.

In order to ensure that no substantial residue of the product P remains on the bed plate 13 when the damper 19 has been opened, at least some of the perforations or gas distributing openings in the bed plate are formed so as to define upwardly directed fluidizing gas flows having a resulting horizontal flow component directed towards the product outlet 17.

Bed plates having perforations or-openings 22 of the so-called gill-type are well-known in the art. Such a gill-type opening may be made in a plate 23 of sheet metal by cutting an incision or slit through the plate and by subsequently pressing one of the edge portions defining the slit out from the plane of the plate 23 so as to form a gill portion 24. As shown in FIG. 2 the cutting of the incision or slit and the subsequent pressing out of an adjacent edge portion may be made by means of a punching tool comprising male and female tool parts 25 and 26, respectively. The male tool part 25 comprises a tooth-like projection 27 having a cutting edge 28 cooperating with an inner surface part 29 of the female tool part 26 so as to cut a slit in the sheet metal plate 23, when the tooth-like projection 27 of the male tool part 25 is moved transversely through the plate 23 and into a hollow space 30 defined in the female tool part 26, which is placed in abutting engagement with the sheet metal plate 23 opposite to the male tool part 25. The tooth-like projection 27 further defines a curved surface part 31, which may, for example, form part of a spherical surface. During the punching movement of the male tool part 25 one of the edge portions defining the slit formed in the plate 23 will be pressed out from the plane of the plate 23 by the curved surface part 31 so as to form the gill portion 24.

When the gill portion 24 is pressed out from the plane of the sheet metal plate 23 by the tooth-like projection 27 the free edge 32 of the gill portion 24 is removed from the free edge 33 of an opposite or second edge portion 34 defining the opening 22. As illustrated in FIG. 3, the orthographic projection of the free edge 32 of the gill portion 24 on the plane of the bed plate 13 is spaced from the edge 33 of the opposite edge portion 24 by a distance designated A. Because of this spacing of the adjacent free edges 32 and 33 defining a conventional opening 22 of the gill type, the powdered or particulate product P in a fluid bed formed on a bed plate 13 having such conventional gill type openings 22 may fall through the openings into the lower chamber or plenum chamber 12 of the fluidized bed apparatus, in which the bed plate is used. Such undesirable fall-through of product is especially likely to take place, when the supply of fluidizing air or gas through the openings 22 is stopped or interrupted for some reason or another.

FIG. 4 shows a bed plate 13 of the type shown in FIG. 3, in which the spacing A of the adjacent free edges 32 and 33 of the edge portions 24 and 34, respectively, are being reduced or-eliminated by a subsequent deformation of the second edge portions 34. Such deformation is of a type increasing the extension of the edge portions 34 in the plane of the bed plate 13, preferably to such an extent that an overlap between adjacent edge portions 24 and 34 in the plane of the plate 13 is obtained. Such a deformation of the edge portions 34 may, for example, be obtained by compression of the edge portions transversely to the plane of the bed plate and-/or by stretching the edge portions 34 along the plane of the bed plate 13. As illustrated in FIG. 4, each of the edge portions 34 may be compressed or pinched between a jaw or projection 35 of a lower supporting tool part 36 and a jaw or projection 37 of an upper tool part 38 which is moveable transversely or at right angles to the plane of the bed plate 13. Thus, when the upper jaw 37 of the tool part 38 is pressed downwardly towards the lower jaw 35 of the lower tool part 36, the thickness of the plane second edge portion 34 is reduced substantially so as to increase the extension of the edge portion. This means that the free edge 33' of the compressed edge portion 34' will extend beyond the free edge 32 of the adjacent gill portion 24 so as to provide an overlap between the edge portions 24 and 34'.

FIG. 5 shows part of a bed plate with an opening 22 where the edge portion 34 has been modified by the method illustrated in FIG. 4 so as to produce an extended edge portion 34'. As illustrated in FIG. 5, the compression operation illustrated in FIG. 4 causes that the original spacing A between the adjacent free edges 32 and 33 is converted into an overlap so that an acute angle $\alpha$ is defined between a line 39 parallel with the plane of the bed plate 13 and a line 40 touching the free edges 32 and 33'.

When the bed plate 13 is arranged so that the gill portions 24 are directed upwardly as shown in FIG. 5, fall-through of product is definitely prevented provided that the angle of slide of the product is equal to or exceeds the angle $\alpha$. As shown in the drawings, the free edge 33' of the compressed edge portions 34' may have an increased thickness so as to form upwardly and downwardly directed rim portions 41 also counteracting product fall-through.

However, when the bed plate 13 shown in FIG. 5 is inverted so that the gill portions 24 are directed downwardly, product particles P which have passed through the opening 22 cannot be safely retained by the downwardly sloping gill portion 24 as illustrated by the parallelogram, of forces in FIG. 6.

Therefore, instead of or in addition to the deformation of the plane edge portions 34 illustrated in FIG. 4, the gill portion 24 may be deformed so as to reduce the spacing or increase the overlap of the adjacent free edges 32 and 33 of the edge portions 24 and 34, respectively. Thus, the gill portion 24 may be compressed and/or stretched so as to reduce its thickness and increase its extension along the plane of the bed plate 13. In order to avoid the situation illustrated in FIG. 6 it may also be desirable to shape the gill portion 24 so as to provide a substantially horizontal or an upwardly inclined product supporting surface thereon.

This may be obtained by using a punching tool as that shown in FIG. 7 for punching the openings 22 in a sheet metal plate 23. The punching tool shown in FIG. 7 is similar to that shown in FIG. 2, and similar parts are therefore provided with the same reference numerals. In FIG. 7, the tooth-like projection 27 of the male tool part 25 is shaped differently from that shown in FIG. 2. In FIG. 7, the tooth-like projection 27 defines a relatively sharp edge 42 which extends substantially parallel with the cutting edge 28 and comes into engagement with the sheet metal plate 23 immediately before the cutting edge 28 engages with the plate 23. This means that the edge 42 bites into the surface of the sheet metal and causes a stretching of a connecting part 43 of the gill portion 24 defined between the sharp edge 42 of the tooth-like projection 27 and a plate backing edge 44 of the female tool part 26. A top surface part 45 of the tool-like projection 27 extending between the cutting edge 28 and the edge 42 preferably defines an acute angle 7 with a plane parallel to the plane of the sheet metal plate 23 so as to cause an outer end part 46 of the gill portion 24 to extend substantially parallel with the sheet metal plate 23 or even to be directed inwardly towards the plane of the plate 23.

FIG. 8 illustrates a bed plate 13 having a gill portion 24 which has been deformed by means of the punching tool illustrated in FIG. 7 so that its outer end part 46 extends substantially parallel with the plane of the bed plate 13. Furthermore, the edge portion 34 has been modified by the method illustrated in FIG. 4. From FIG. 8 it is apparent that by stretching of the gill portion 24 by means of the punching tool illustrated in FIG. 7 the spacing of the free edges 32 and 33' of the stretched gill portion 24 and the non-compressed, plane edge portion 34, respectively, has been reduced to a value "a" substantially smaller than "A" in FIG. 3. It is also apparent that compression of the edge portion 34 by the method illustrated in FIG. 4 causes a prolongation of the same indicated by "B" whereby an overlap "C" is obtained, "C" being equal to "B" minus "a". The combined compression of the edge portion 34 and stretching of the gill portion 24 causes that the angle α is substantially reduced compared with the angle α in FIG. 5. This means that a product having an angle of slide equal to or exceeding the angle α shown in FIG. 8 cannot fall through the openings of the bed plate because it will be supported and retained by the substantially horizontal outer end part 46 of the gill portion 24.

Figure 9:
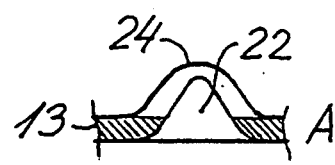
Figure 9:
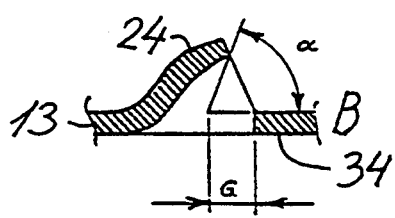
Figure 10:
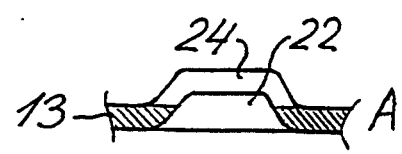
Figure 10:
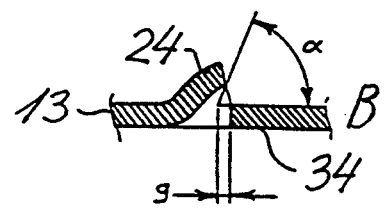

FIG. 9 and 10 illustrate two different types of gill openings, namely an opening, which is relatively narrow and high, and an opening which is relatively broad, flat and low, respectively. It is immediately apparent that when a product having an angle of slide α is fluidized in a fluid bed the risk of product fall-through is substantially higher when the openings 22 of the bed plate are of the type shown in FIG. 9 than when they are of the type shown in FIG. 10. It is also immediately apparent that the necessary overlap "g" to be provided between the edge portions 24 and 34 in FIG. 10 in order to avoid product fall-through is much less than the corresponding necessary overlap "G" in FIG. 9. Therefore, the openings 22 of the bed plate 13 according to the invention shown in FIGS. 5, 6, and 8 are preferably of the flat, broad, and low type shown in FIG. 10.

It should be understood that various modifications and amendments of the embodiments shown in the drawings and described above could be made within the scope of the present invention. Thus, the reduction of the spacing or the overlap between adjacent end portions 24 and 34 may be provided by any kind of deformation, such as stretching and/or compression of the one or both of the adjacent edge portions. Furthermore, the deformation of the edge portion or portions may be made by the punching operation and/or by one or more subsequent operations. It should also be understood that the bed plate according to the invention may comprise openings of the gill type modified in accordance with the present invention as well as other types of openings which may be conventional.

We claim:

1. A fluidized bed apparatus comprising
a bed plate (13) which is made from sheet metal, defining a first general side surface and having a plurality of gas distributing openings (22) formed therein, each of said openings being defined between first and second opposite edge portions (24,34), of which at least the first edge portion (24) has been pressed out from said general side surface,
means (12,14) for passing gas upwardly through the openings (22) of the bed plate (13) for fluidizing a powdered or particulate product (P) thereon,
means (16) for supplying powdered or particulate product to the bed plate, and
means (17,19) for removing fluidized product therefrom, characterized in that the thickness of at least part of at least one of said first and second edge portions (24,34) has been reduced so as to increase the extension thereof along said first general side surface, and so as to thereby reduce or eliminate the orthographic projection on said first general side surface of the opening defined between said first and second edge portions.

2. An apparatus according to claim 1, wherein the first and second edge portions (24,34) are located on opposite sides of a cut made in the sheet metal.

3. An apparatus according to claim 1 or 2, wherein said first general side surface is substantially planar.

4. An apparatus according to claim 1 or 2, wherein the first and second edge portions (24,34') at least partly overlap in an orthographic projection on said first side surface.

5. An apparatus according to claim 1, wherein at least part of the second edge portion (34) has been compressed so as to reduce its thickness.

6. An apparatus according to claim 1, wherein at least part (43) of the first edge portion (24) has been stretched.

7. An apparatus according to claim 1 or 2, wherein the first edge portions (24) comprises an outer part (46) defining a free edge (32) and an inner connecting part (43) separated from the outer part by a relatively sharp bend, a cross-section of the inner and outer parts taken substantially at right angles to said free edge defining first and second acute angles, respectively, with said general side surface, the second acute angle being substantially smaller than the first angle.

8. An apparatus according to claim 7, wherein the outer part (46) extends substantially parallel with the first general plane.

9. An apparatus according to claim 7, wherein the thickness of the inner pert (43) has been reduced by stretching.

10. An apparatus according to claim 1 or 2, wherein each opening (22) is elongated (FIG. 10a) and defined between a pair of co-extending or substantially parallel edges.

11. An apparatus according to claim 1 or 2, wherein the openings of the bed plate are arranged in pairs of substantially oppositely directed openings, a depressed portion of the plate extending between the openings of each pair.

12. A method for making a bed plate (13) for a fluidized bed apparatus according to claim 1 from sheet metal (23), said method comprising forming a plurality of mutually spaced cuts or slits in the sheet metal, each slit being defined between opposite first and second edge portions (24,34), and pressing at least the first edge portion (24) out from a plane defined by the sheet metal (23) so as to form an opening, characterized in deforming after forming said slit at least one of said first and second edge portions (24,34) so as to increase the extension thereof along the plane of the sheet metal.

13. A method according to claim 12 wherein said at least one edge portion is deformed so as to provide at least partial overlap of the opposite edge portions (24,34) viewed at right angles to the plane of the sheet metal (23).

14. A method according to claims 12 or 13, wherein the wall thickness of at least part of said at least one edge portion (24,34) is reduced so as to cause said increase of extension.

15. A method according to claim 14, wherein said part of the edge portion (34) is pinched or compressed between tool parts (35,37) engaging with opposite surfaces of the edge portion.

16. A method according to claim 14, wherein said part (43) of the edge portion (24) is stretched.

17. A method according to claim 12 or 13, wherein each opening (22) is formed by means of a punching tool (25,26) having a cutting edge (28) and moved substantially at right angles to the plane defined by the sheet metal (23) so as to cut said slit therein, the punching tool being moved further in relation to the sheet metal so as to press the first edge portion (24) out of the plane defined by the sheet metal.

18. A method according to claim 17, wherein an outer part (46) of the first edge portion (24) adjacent to its free edge (32) is substantially prevented from moving in relation to the punching tool, whereby an inner connection part (43) of the first edge portion (24) is stretched.

19. A method according to claim 18, wherein the punching tool (25,26) comprises a sharp tool edge (42) coextending with or extending substantially parallel with said free end (32).

20. A method according to claim 19, wherein the punching tool comprises first and second substantially planar surface parts being separated by said sharp tool edge (42) for forming the inner and outer parts (43,46), respectively, of the first edge portion (24), the first plane surface defining a first acute angle with the plane defined by the sheet metal (23) and the first and second plane surfaces mutually defining an angle, which is smaller than the angle supplemental of the first acute angle.

21. An apparatus according to claim 4, wherein at least part (43) of the first edge portion (24) has been stretched.

22. An apparatus according to claim 8, wherein the thickness of the inner part (43) has been reduced by stretching.

23. A method according to claim 15, wherein said part (43) of the edge portion (24) is stretched.

* * * * *